June 21, 1955  A. HOWARD  2,711,074
AFT FRAME AND ROTOR STRUCTURE FOR COMBUSTION GAS TURBINE
Filed June 22, 1944  5 Sheets-Sheet 2

Inventor:
Alan Howard,
by Harry E. Dunham
His Attorney.

Inventor:
Alan Howard,
by Harry E. Dunham
His Attorney.

June 21, 1955  A. HOWARD  2,711,074
AFT FRAME AND ROTOR STRUCTURE FOR COMBUSTION GAS TURBINE
Filed June 22, 1944  5 Sheets-Sheet 4

Inventor:
Alan Howard,
by Harry E. Dunham
His Attorney.

Fig.14.

Inventor:
Alan Howard
by *Harry E. Dunham*
His Attorney.

United States Patent Office 2,711,074
Patented June 21, 1955

2,711,074

AFT FRAME AND ROTOR STRUCTURE FOR COMBUSTION GAS TURBINE

Alan Howard, Schenectady, N. Y., assignor to General Electric Company, a corporation of New York Application June 22, 1944, Serial No. 541,565

13 Claims. (Cl. 60—39.37)

The present invention relates to gas turbine power plants of the type comprising an air compressor supplying air under pressure to a combustion chamber or combustor in which fuel is burned and from which the hot products of combustion, hereinafter called hot gases, are supplied to a turbine wheel, the turbine wheel in turn driving the air compressor, the excess power in the hot gases over that required to drive the air compressor being used to generate power. A gas turbine power plant embodying my invention is well adapted for use on aircraft for propelling them and it is this application of my invention which I have elected specifically to illustrate and describe. It is to be understood, however, that the invention is not limited necessarily to this use and also that certain features of the invention, while especially applicable to gas turbine power plants, may find other applications.

In carrying out my invention in its application to an aircraft, I may utilize in the turbine wheel only sufficient energy from the gases to run the air compressor and certain auxiliaries appurtenant to the power plant, such as a fuel oil pump or pumps and a lubricating pump or pumps, the remaining energy being utilized to drive the aircraft by means of jet propulsion. Or, all the energy may be utilized in the turbine wheel and the power thus made available used to drive a conventional bladed propeller. Or, the available energy may be extracted by a separate turbine or other means of generating power. Also, I may utilize any combination of the foregoing.

The object of my invention is to provide an improved gas turbine power plant and for a consideration of what I believe to be novel and my invention, attention is directed to the following specification and to the claims appended thereto.

In the drawing, Figs. 1 and 2 when placed end to end form a continuous section through the power plant; Fig. 3 is a transverse sectional view taken on line 3—3, Fig. 1, but showing the complete power plant; in Fig. 3 a part of two adjacent combustion chambers have been broken away to show a web structure; Fig. 4 is a detail plan view on a larger scale of adjacent portions of two air discharge conduits; Fig. 5 is a detail sectional view taken on line 5—5, Fig. 4; Fig. 6 is a detail sectional view on a larger scale showing the arrangement for connecting together certain parts.

Figure 14:
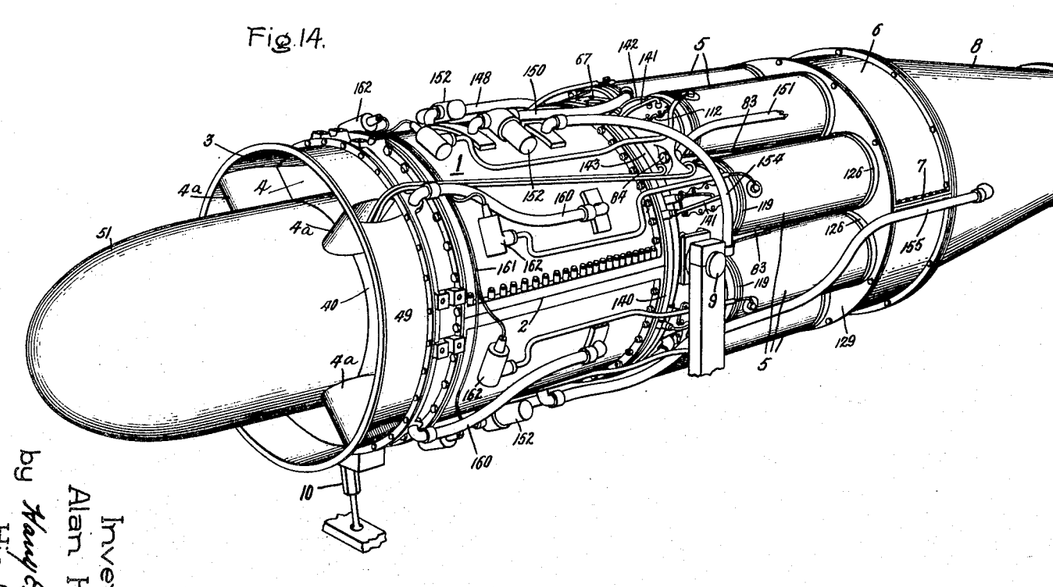
Fig. 14 is a perspective view of the power plant, the outer casing being omitted.

Referring first to Fig. 14, 1 indicates the compressor stator casing which is split axially, the two halves having bolted together flanges as is indicated at 2. Air is supplied to the admission end of the compressor through an annular passage 3 across which are tubular streamlined struts 4 through some of which piping passes. Air from the compressor is supplied to a ring of combustion chambers 5 which supply hot gases to a turbine wheel located in an aft frame casing 6 which is split axially, the two halves having bolted together flanges as is indicated at 7. Bolted to casing 6 is an exhaust cone, the outer wall of which is indicated at 8. The power plant as a unit may be supported in an aircraft on two diametrically opposite central supports, one of which is shown at 9, and a front or admission end steady support 10. The weight of the unit is carried by the two supports 9. Support 10 serves primarily as a steadying and positioning support.

Figure 11:
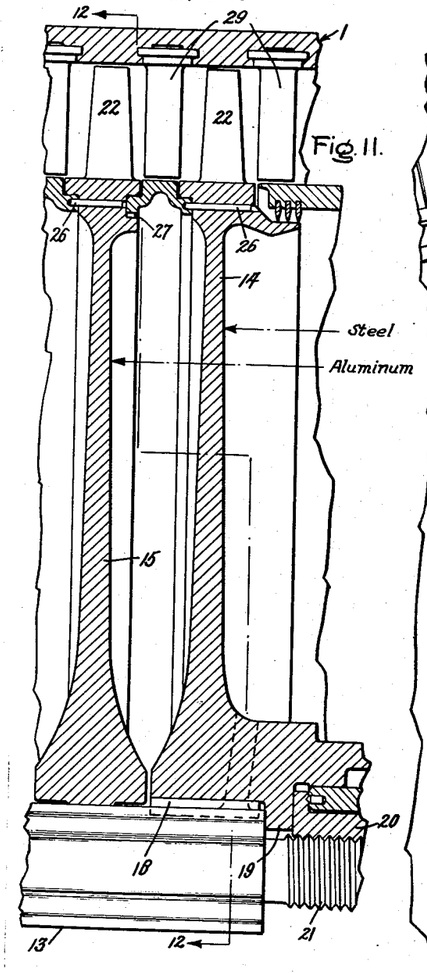
Fig. 11 is a detail sectional view of adjacent compressor wheels.
Figure 12:
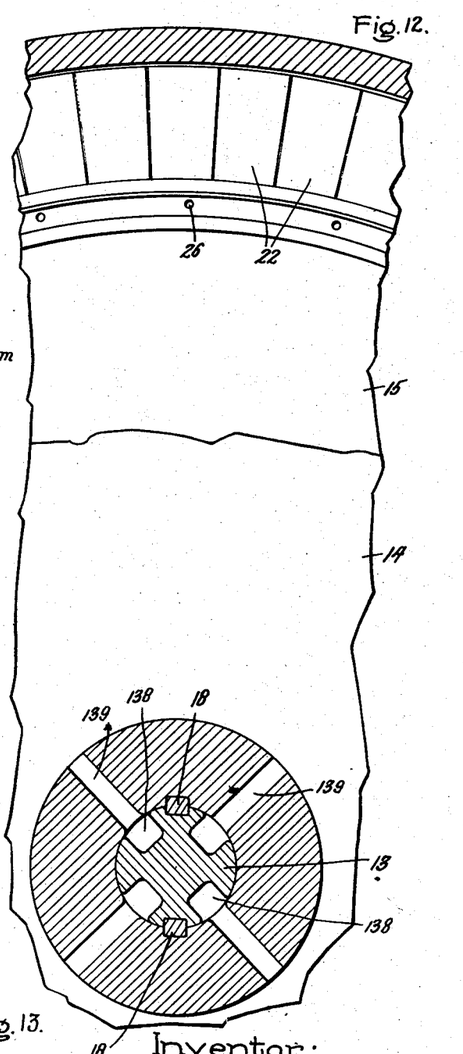
Fig. 12 is a detail sectional view taken on line 12—12, Fig. 11.
Figure 13:
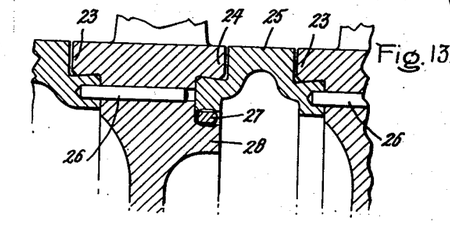
Fig. 13 is a fragmentary view on a larger scale of a part of the construction shown in Fig. 11.

Referring now to Figs. 1, 11, 12 and 13, the compressor rotor comprises a shaft 13, a last stage wheel 14, which may be termed a driving wheel and which is preferably formed from steel, and a plurality of wheels 15 in advance of the last stage wheel which are preferably formed from aluminum or other light weight metal. The shaft is decreased in diameter slightly in steps from the admission end of the compressor to the discharge end as is indicated by the lines 16. The successive wheels 15 are shrunk on the shaft, the first stage wheel being positioned by a collar 17 on the shaft. They are not keyed to the shaft, the only connection being the shrink fit. The driving wheel 14 is shrunk on the shaft and is fastened by a plurality of keys 18, two being shown in the present instance (Fig. 12). Thus, wheel 14 is fixed to the shaft with a positive driving connection. The hub of wheel 14 is provided with an annular inwardly projecting flange 19 which fits against the end of the shaft and is held by a sleeve nut 20 which threads onto a short thread 21 on the end of the shaft. Each wheel has a ring of blades 22 of suitable shape attached to the wheel rim in any suitable way. The rims of adjacent wheels are spaced apart and are provided with rabbets on opposite sides to form undercut shoulders 23 and 24 (see Fig. 13). Connecting each pair of adjacent shoulders is a spacer ring 25 which has a shrink fit with the shoulders and on one side is held by a plurality of circumferentially spaced pins 26 and on the other side by a calking wire 27 driven into the space between the inner side of the spacing ring and an annular projection 28 on the wheel rim. Spacer rings 25 are of a contour such that they are not self supporting so that at higher speeds they expand under the action of centrifugal force into tighter engagement with shoulders 23 and 24. In assembling the rotor, the first stage wheel 15 may be shrunk into position on the shaft against collar 17. Following this, the spacer ring 25, having been previously cooled, is assembled between the first and second stage wheels with its inner edge under shoulder 24. The spacer ring 25 is then brought up to the temperature of the wheel after which it may be forced still more tightly against the undercut surface of shoulder 24 by driving into place the calking wire 27. Next, the second stage wheel may be shrunk into position, its shoulder 23 being brought into engagement with the other side of spacer ring 25, following which the pins 26 may be inserted. Following this, the successive spacer rings 25 and wheels 15 may be positioned one after the other until finally the last stage wheel 14 is positioned. With this arrangement, the rims of the several wheels are firmly connected together with the result that substantially the entire drive is taken by the friction between the spacer rings and the wheels. Part of the friction comes from the shrink fit between the shoulders and the spacer rings, a part from the axial compression between the sides of the wheel rims and the spacer rings, and a considerable portion from the increase in friction between the wheel rims and the spacer rings at higher speeds due to expansion of the spacer rings by centrifugal force, the rings being not self supporting at high speed as pointed out above. Also, preferably the arrangement is such that the axial distance between the hubs of the first and last stage wheels is slightly less than the distance between their rims so that the wheels are not quite radial. Then under the action of centrifugal force they tend to straighten thus increasing the axial compression between the sides of the wheel rims and hence the driving friction between these parts.

Figure 1:
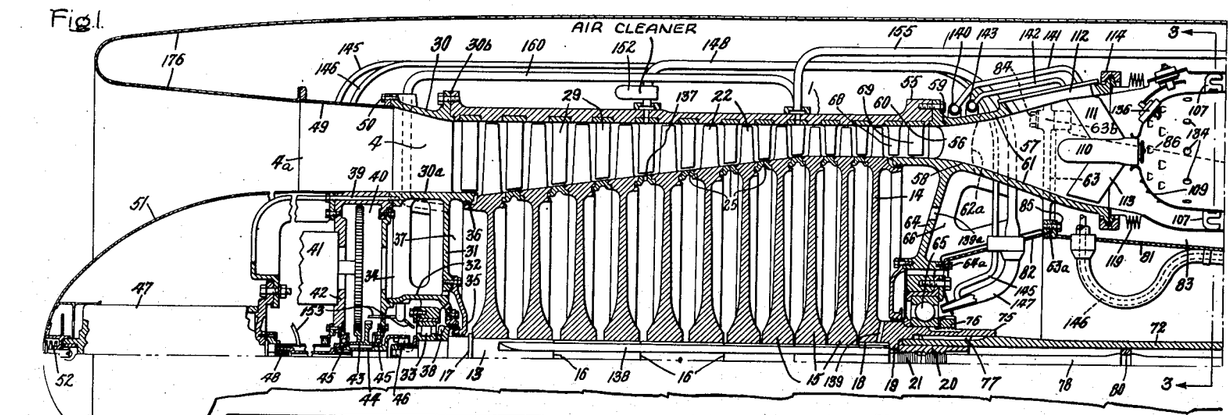
Fig. 1 is a longitudinal sectional view of the compressor end of the gas turbine power plant, the lower portion being broken away since the construction is symmetrical.

In assembling the structure, the wheels 15 may be assembled on shaft 13 as already explained and initially such wheels will be radial. Then the wheel 14, which is made from steel, is placed on the shaft and forced to its final position by screwing up nut 20 to bring flange 19 against the end of the shaft. By dimensioning the parts so that the axial length of the stacked together wheel rims and spacer rings is slightly greater than the distance between collar 17 on shaft 13 and the end of the shaft 13 against which flange 19 engages then when nut 20 is tightened to force flange 19 against the shaft end, wheel 14 will be dished slightly and will force some dish into the other wheels. In the present instance, the wheel hubs are not in engagement with each other, although they may be dimensioned to engage if found desirable. In a structure in which the hubs engage, the dishing may be obtained by making the overall hub length less than the overall rim length. The middle wheel may be radial and the wheels on the opposite sides dished in opposite directions. Some drive is obtained also from the friction between the wheel hubs and the shaft but this is small compared to the drive through the rims. To increase the coefficient of friction between the spacing rings and the shoulders, the engaging surfaces may be covered sparsely with emery dust or similar material before they are shrunk together. With this arrangement, the emery dust particles embed themselves in both faces, thus greatly increasing the friction. Or, instead of using emery dust particles, the contacting surfaces may be knurled. To advantage, the emery dust may be applied to the surfaces by making a solution of some very thin carrier, such as a lacquer, in which the desired proportion of emery dust is suspended, the lacquer then being painted or sprayed on the surfaces.

As stated above, the last stage wheel 14 of the compressor may be formed from steel, the other wheels being formed of aluminum or other light weight metal. With this arrangement, the drive is primarily from the shaft, through the last stage wheel 14 which is rigidly keyed to the shaft, to the rim of the wheel 14, and thence through the rims of the successive wheels.

By the foregoing arrangement, I provide a compressor rotor construction which is easy to assemble and dismantle and which avoids the need for keyways in the shaft and keys for fixing all the wheels to the shaft. This results in a rotor which can be built at relatively low cost and upon which wheels can be readily replaced.

Carried by compressor casing 1 and attached to it in any suitable way are stationary compressor blades 29.

The discharge ends of the streamlined hollow struts 4 are formed integral with and are carried by outer and inner walls 30 and 30ª, outer wall 30 having a rear flange bolted to the forward compressor stator casing flange as is indicated at 30ᵇ. Carried by inner wall 30ª is a radially inwardly extending wall 31 which at its inner portion carries an axially projecting sleeve 32 which forms a housing and support for a roller bearing 33 in which the forward end of shaft 13 is mounted. Sleeve 32 is connected to walls 30ª and 31 and is reinforced by radially extending webs 34. The opening in end wall 31 through which shaft 13 projects is sealed by a suitable labyrinth packing arrangement 35 and the first stage wheel at its periphery is sealed with respect to wall 30ª by a labyrinth packing 36. This serves to define between the first stage wheel 15 and casing end wall 31 a sealed balancing chamber 37. At 38 are vanes which form a ventilating fan to effect circulation of air over roller bearing 33 to cool it. Members 4, 30, 30ª, 31, 32, 34, together comprise the "forward frame."

Attached to the front end of wall 30ª by a ring of bolts 39 is an accessory casing assembly including walls which define a gear casing 40 in which is located gearing for driving the several auxiliaries, such as the fuel pump or pumps and the lubricating pump or pumps. One of these auxiliaries is indicated at 41. The auxiliaries and the arrangements for driving them are not shown in detail as their specific arrangement forms no part of the present invention. They may be carried by the front wall 42 of the gear casing. The common driving pinion 43 for the gearing is carried by a shaft 44 mounted in suitable ball bearings 45. Shaft 44 is connected to shaft 13 by a toothed or splined coupling 46. At 47 is indicated a starting motor and generator connected to shaft 44 by a suitable sleeve coupling 48. Struts 4 may be provided with a streamlined leading edge portion 4a formed integral with an annular wall 49 which is bolted to wall 30 as is indicated at 50. Over the front end of the unit is a rounded cap or nose 51 which blends into the outer wall of gear casing 40, its end fitting under the entrance ends of struts 4a. The nose may be held in position by a fastening device of any suitable structure, a spring latch being indicated generally at 52.

Figures 3, 4, 5, 6:
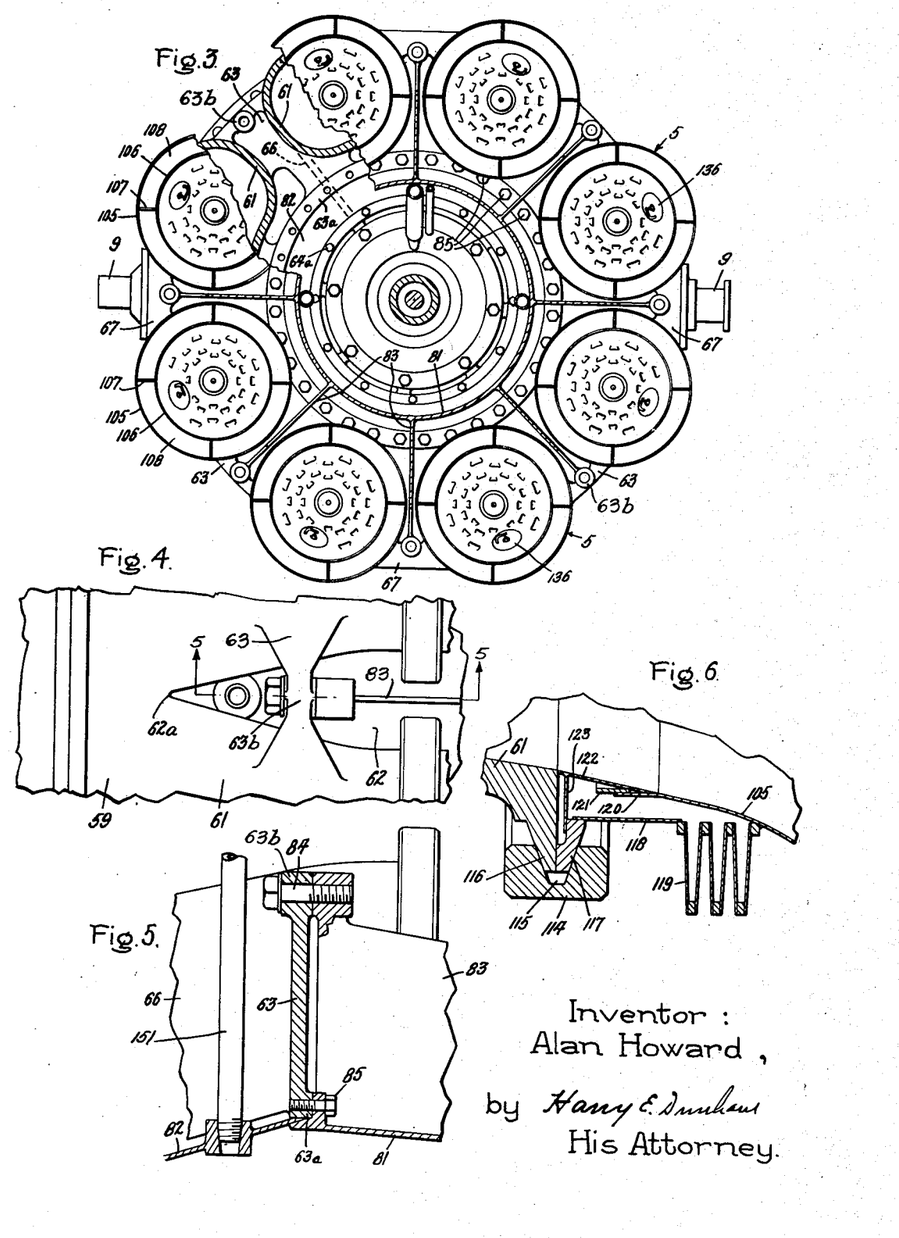

At its discharge end, compressor casing 1 is provided with a flange 55 to which is bolted a unitary casting structure or "mid-frame" having walls including a forward portion defining an annular air discharge passage 56 from which transition passages 57 convey air from the compressor to the several combustion chambers. The forward portion of the walls which define passage 56 are indicated at 58 and 59 in Fig. 1, being inner and outer annular walls fixed in spaced relation by circumferentially spaced webs 60. Each passage 57 is formed by walls 61 which at their inlet end define an admission opening which is oval-shaped, with the larger diameter extending circumferentially and which from the admission end converge in a circumferential direction and diverge in a radial direction to form a circular discharge end. In other words, the walls are shaped to provide transition passages 57 which are oval at their inlet ends and round at their discharge ends. The top plan view, Fig. 4, shows adjacent walls 61 and the manner in which they converge. Thus between walls of adjacent passages 57, there is formed a wedge shaped opening 62. The apex of the wedge shaped opening is indicated at 62ª in Figs. 4 and 1. Extending circumferentially between adjacent walls 61 are webs or "bridges" 63 which serve to tie walls 61 together. One of these webs is shown in dotted lines in Fig. 1, in top plan in Fig. 4 and in section in Fig. 5. Their contour is seen best from Fig. 3 where portions of adjacent combustion chambers are broken away to show one in end view. It will be seen that the webs 63 extend radially inward past walls 61 and terminate in a rear attachment flange 63a. At their radially outer portion, between adjacent transition section walls 61, the webs 63 are provided with attachment bosses 63ᵇ, as shown in Figs. 1, 3, 4, and 5. Formed integral with inner wall 58 is an inwardly extending wall 64 in which is carried a mid-bearing 65 for supporting the rear end portion of shaft 13. End wall 64, walls 61, and webs 63 are reinforced by axially extending webs 66. Also a cylindrical shroud 82 is secured by bolts 64ᵃ to wall 64 and extends to flange 63ᵃ, as shown in Fig. 1. Thus there is provided an integral structure or "mid-frame" comprising walls 61, forming passages 56, 57, and webs 63, 64, 66, this integral casing being very rigid and attached securely to the compressor stator casing as a unit, thus providing a strong rigid integral ring structure at the discharge end of the split compressor stator casing.

On diametrically opposite sides, webs 63 are integral with, or viewed from another aspect, are enlarged to form, pads 67 to which supports 9 are bolted. Two sets of pads 67 are provided located on axes at right angles to each other so that the power plant may be mounted on any pair of pads.

It will be noted that supports 9 are connected to the rigid mid-frame structure already referred to, which means that the mid-frame carries the rest of the power plant. Preferably one of the supports 9, for example the right hand support in Fig. 3, is provided with flanges while the other support is not so provided whereby the one support serves as a locating member for the power plant and the plant is free to move transversely relatively to the other support. In other words, the power plant is restrained from transverse movement on one side only.

For directing air to passages 57, casing 1 is provided with two sets of stationary blades 68 and 69 which serve to straighten out the air flow and direct the air in an even smooth stream to the passages.

Figure 2:
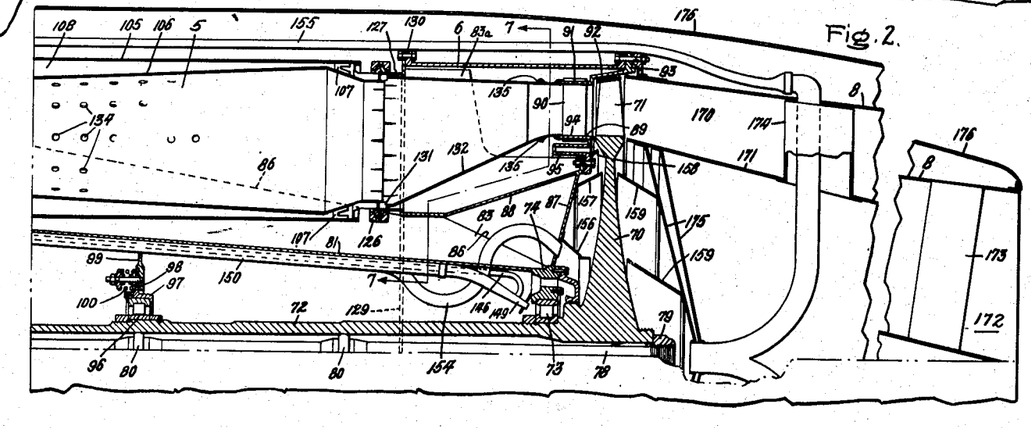
Fig. 2 is a sectional view of the combustion chamber and turbine wheel end of the power plant, the lower portion of the construction being broken away as in Fig. 1 and also a portion of the right hand end of the structure being broken away.

Referring to Fig. 2, turbine bucket wheel 70 having a ring of buckets 71 is carried on the end of a relatively long hollow quill shaft 72. Adjacent the turbine wheel the shaft is supported in an aft bearing 73 the outer race of which is supported in an annular ring 74. The turbine wheel is thus "overhung" on the end of the shaft. The other end of shaft 72 is connected to shaft 13 (Fig. 1) and is thus supported in bearing 65. To this end, the hub of compressor wheel 14 is provided with an axially extending sleeve 75 on the outside of which the inner race of mid-bearing 65 is fastened by a nut 76 and the inside of which is provided with splines 77 engaging mating splines on the end of shaft 72. Turbine wheel 70 and shaft 72 are held axially by a bolt 78 which at one end threads into sleeve nut 20 and at the other end receives a nut 79 engaging the outer surface of the wheel hub portion. On the shaft are a number of axially spaced guide rings 80 which may be integral therewith or suitably attached thereto.

The hollow turbine shaft 72 is surrounded by an "aft frame" structure comprising an aft frame cylinder 81 which at its forward end has an attachment flange bolted to flange 63a and at its rear end is connected to aft bearing support ring 74. Formed integral with cylinder 81 are radially projecting axially extending ribs 83 which extend the length of cylinder 81, and are secured to the outer surface thereof. At their forward ends these ribs are secured to the attachment bosses 63b by the bolts 84, as shown clearly in Fig. 5, being held also by the ring of bolts 85 to the attachment flange 63a. These ribs are of comparatively thin section as may be seen in Fig. 3, and their contour may be seen in Figs. 1 and 2 as indicated by the dotted line 86. This contour tapers down to the rear bearing support ring 74 as may be seen in Fig. 2. As may also be seen in Fig. 3, each rib 83 is located between a pair of adjacent combustors 5. It will be apparent from the drawings that the aft frame cylinder 81 and the reinforcing ribs 83 form a rigid frame supporting the ring 74 from the mid-frame casing.

Integral with ring 74 is a turbine nozzle diaphragm support wall 87 which is reinforced by a conical wall 88 which at its rear end is secured to the circumference of wall 87 and at its forward end is secured to the outer edges of webs 83. Walls 87 and 88 form a support flange for the turbine nozzle diaphragm 89.

Integral with wall 88 are radially projecting axially extending ribs 83ᵃ which stand in line with ribs 83 and extend between each pair of combustion chambers. The ribs 83 and 83ᵃ between each pair of adjacent combustion chambers form in substance one continuous rib.

Figure 9:
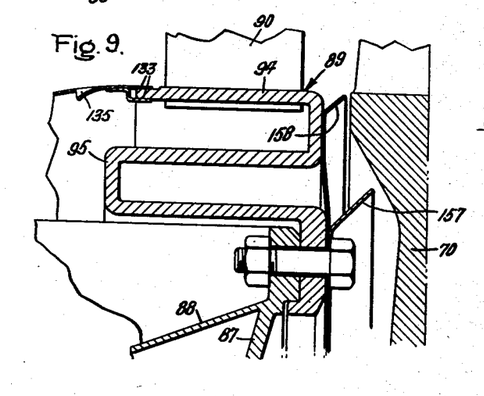
Fig. 9 is a detail sectional view on a larger scale illustrating the arrangement for supporting the nozzle ring which supplies hot gases to the turbine wheel and showing the adjacent turbine wheel.

The turbine nozzle diaphragm assembly comprises nozzle partitions 90 shaped to define between them nozzle passages of the desired contour for directing hot gases from the combustion chambers to the turbine wheel buckets. At their radially outer ends nozzle partitions 90 are supported in a ring 91 integral with which is an annular shroud 92 which surrounds the turbine wheel and terminates in a rear aft frame bolting flange 93. At their radially inner ends the nozzle partitions are supported on the outer convolution 94 of a reversely curved structure 95, the inner portion of which is bolted to the peripheral edge of wall 87. (See Fig. 9). This serves to permit of expansion and contraction of the nozzle ring relative to the comparatively cooler walls 87, 88.

Figure 10:
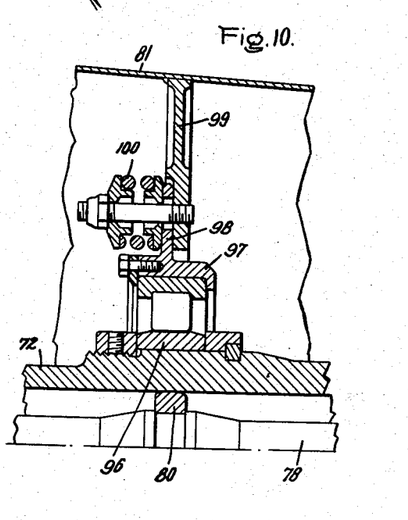
Fig. 10 is a detail sectional view on a larger scale showing a bearing arrangement.

Shaft 72 is relatively long and to dampen any vibrations which tend to be set up in it, there is provided between bearings 65 and 73 a vibration damping means comprising a roller bearing the inner race 96 of which is fixed to shaft 72 (see Fig. 10) and the outer race of which is carried in an annular retainer 97. Integral with retainer 97 is a radially extending friction plate 98, the friction face of which engages a friction face on an annular plate 99 supported in housing 81. The friction surfaces are held in engagement by compression springs 100 in the manner clearly shown in Fig. 10.

The combustion chambers 5 are located between the discharge end of the compressor and the inlet end of the turbine. They are arranged in a circle around aft frame cylinder 81 and, as will be seen from Fig. 14, are located substantially within the overall diameter of compressor casing 1 and aft frame casing 6. In the present instance, eight combustion chambers are shown but obviously any other suitable number could be used.

Referring particularly to Figs. 1 and 2, each combustion chamber comprises outer and inner walls or liners 105 and 106 which are held in spaced relation to each other by spacers 107 to provide an annular air space 108. The forward end of inner liner 106 is closed by an end wall 109 having a central opening through which projects the end of a suitable fuel nozzle 110. Fuel nozzle 110 is carried by a tubular streamlined strut 111 formed integral with a cover plate 112 which fits over an opening in outer wall 61 and is secured by suitable means to a mounting pad surrounding the opening. Thus the fuel nozzle can be removed by removing cover plate 112. On the side of the fuel nozzle opposite tubular post 111 is a tubular streamline shaped balancing wing 113 which functions to make the air flow passage aerodynamically symmetrical on both sides of the fuel nozzle. Outer combustor casing 105 is attached to the discharge end of transition section wall 61 by a suitable split ring 114 (see Fig. 6) which has a tapered groove 115 into which a tapered flange 116 on the discharge end of wall 61 and a tapered flange 117 carried by outer wall 105 are clamped. The end of wall 105, which is attached to flange 117, is provided with a telescoping arrangement to permit of thermal expansion and contraction of wall 105. To this end, flange 117 (see Fig. 6) is connected to wall 105 at a point spaced back from its end through the intermediary of a ring 118 and a bellows structure 119, the several parts being suitably welded together. The admission end of wall 105 is flared outwardly as is indicated at 120 and has sliding engagement with a collar 121 fixed to a sleeve 122 which in turn is connected to flange 117 by a wall 123. Sleeve 122 is flush with the inner surface of wall 61. With this arrangement, it will be seen that the flared end of wall 105 may move axially with respect to flanges 116 and 117, the flared end sliding on collar 121, and the corrugated structure 119 yielding. Any such movement may take place without opening up a crack for the escape of air and without materially disrupting the smooth interior surface over which the air flows.

Figure 8:
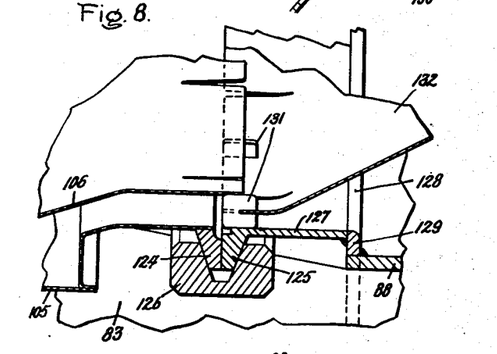
Fig. 8 is a detail sectional view on a larger scale of connecting means between certain of the parts.

At its discharge end, combustion chamber casing 105 (see Fig. 8) is provided with a flange 124 which is clamped to a flange 125 by a suitable split ring 126. Flange 125 is formed integral with and is carried by a combustor support ring 127 which in turn is welded to the circumference of a round opening 128 in an annular plate 129. Combustor support plate 129 extends entirely around the aft frame structure and is provided with a circular opening for each combustor support flange 127. At its periphery, plate 129 is bolted to a flange at the forward end of aft frame casing 6 as is indicated at 130. At its inner edge, it fits around and is welded to the end of wall 88. Or otherwise considered, there is welded to the forward end of wall 88, and the outer edges of ribs 83, a large combustion support collar 129 which at its periphery is bolted to casing 6 at 130 and this large collar is provided with openings 128, one for each combustion chamber and over which openings the combustor support flanges 127 are welded. Thus cylinder 81, ribs 83 and 83$^a$, nozzle diaphragm support walls 87, 88, annular plate or collar 129 and the several flanges 127 form a welded unitary aft frame structure.

Figure 7:
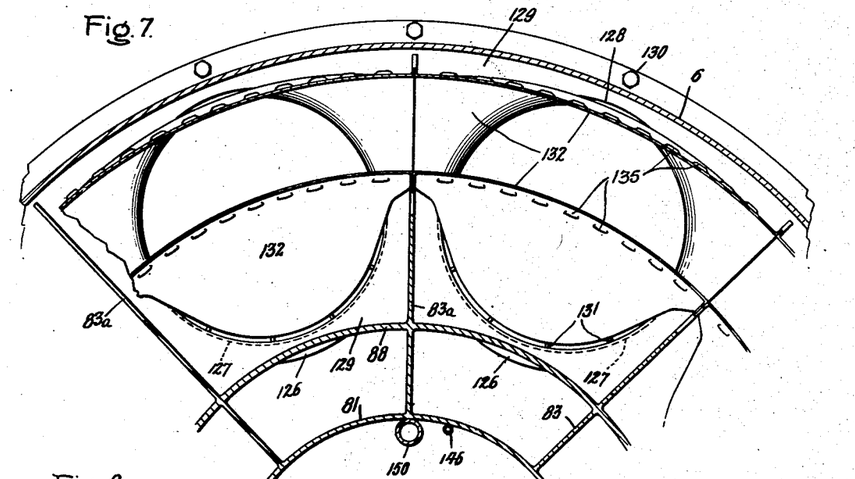
Fig. 7 is a detail sectional view on a larger scale on irregular line 7—7, Fig. 2.

The rear end of inner liner 106 projects inside flange 127 and is held in spaced relation to wall 127 by spacers 131. Supported by the central portion of spacers 131 is one end of a hot gas transition piece 132 or nozzle box which conveys hot gases from the combustion chamber to the nozzle ring. There is a transition piece 132 for each combustion chamber. At their admission ends they are round and from their admission ends their walls diverge in a circumferential direction and converge in a radial direction to an extent such that their discharge ends together form a continuous annular discharge passage for supplying hot gases to the nozzle ring. This is shown best in Fig. 7. At their discharge ends they have a suitable sliding connection with outer nozzle ring 91 and inner ring 94, as shown particularly at 133 in Fig. 9. In inner liner 106 are suitably arranged openings 134 for causing a flow of air from annular chamber 108 to the interior of liner 106. Adjacent its discharge end transition conduit 132 is provided with spaced air flow openings 135 formed by striking outwardly material of the conduit. At 136 are ignition plugs for the combustion chambers. The ignition plug arrangement indicated is not a part of my invention. It forms the subject matter of Patent Number 2,403,860, issued July 9, 1946 on an application of C. F. Heath, Serial No. 541,605 filed of even date herewith and assigned to the same assignee as the present application. The combustion chamber arrangement is broadly covered by application Serial No. 501,106, filed September 3, 1943 in the name of Anthony J. Nerad, and assigned to the same assignee as the present application, but now abandoned.

For effecting circulation of air in the spaces between the compressor wheels, there is provided in the spacing ring 25 at a suitable stage of the compressor, in the present instance the fourth stage, a number of circumferentially spaced openings 137 (Fig. 1) through which air may flow to the space between the adjacent wheels. From such space, air may circulate through longitudinally extending grooves 138 in shaft 13 to the other spaces between the wheels. In the present instance four grooves 138 are shown (Fig. 12). From grooves 138 air may be discharged through radially extending holes 139 in the hub of wheel 14 to the space between wheel 14 and wall 64. From such space it may escape through passages 139$^a$ in wall 64.

In the present instance, the several fuel nozzles 110 are shown as being of the so-called "recirculating" type, a well-known type of wide-range nozzle. Surrounding the mid-frame structure is a supply pipe 140 which forms a fuel oil header to which fuel oil is supplied from a fuel pump (not shown) and from which branch pipes 141 lead to each fuel nozzle. Leading from each fuel nozzle is return pipe 142 which connects with a header 143 similar to supply pipe 140.

At 145 and 146 are pipes which lead from a lubricant pump (not shown) out through a tubular strut 4, pipe 145 going to bearing 65 and pipe 146 to bearing 73. Pipe 145 connects with an air nozzle 147 which is connected by a pipe line 148 with a stage of the compressor, the fourth stage in the present instance. Pipe 146 connects with an air nozzle 149 which in turn is connected with the fourth compressor stage by a pipe line 150. Pipe lines 148 and 150 function to supply air to bearings 65 and 73 to cool them and to atomize lubricating oil and spray it on the bearings. From these bearings, air and oil mist flow into the space between shaft 72 and walls 81 and 82 from which space it may be conveyed away by one or more pipes 151 (Fig. 5) which may discharge to any suitable point such as into the slip stream. In pipe lines 148 and 150 are suitable air cleaners 152. Bearing 33 and such other parts at the front end of the power plant which require lubricating may be supplied with lubricant through suitable pipes such as those indicated at 153 in Fig. 1.

Air from a suitable stage of the compressor is supplied to the turbine wheel on opposite sides thereof for cooling the wheel. In the present instance, this cooling air is shown as being taken from the eighth stage of the compressor by a number of pipes 154 and 155, the pipes 154 leading to the admission side of the turbine wheel and the pipes 155 to the discharge side (see Figure 2). The pipes 154 project through wall 87 and discharge cooling air beneath a baffle plate 156 which serves to distribute the air around the wheel. The air flows radially outward past the inner edge of baffle plate 156 and thence past baffle plates 157 and 158 (see Figures 2 and 9) to the wheel buckets where it mingles with and is carried away by the gases discharging from the nozzle ring. Similarly, cooling air from pipes 155 discharges beneath a series of baffle plates 159 which serve to distribute the air over the surface of the wheel and discharge it into the stream of gases leaving the buckets. Also, from a suitable stage of the compressor, the eighth stage in the present instance, one or more pipes 160 lead to the balancing chamber 37 to maintain in such chamber a pressure to balance axial thrust on the rotor. At 161 (Fig. 14) is indicated wiring for the ignition plugs, 162 being high tension ignition coils used in the wiring system.

The hot gases discharged from turbine wheel 70 are directed through an annular passage 170 defined by tailcone or wall 8 and an inner cone 171 to a suitable discharge nozzle 172 from the end of which the gases may be discharged to effect jet propulsion of an aircraft. Walls 8 and 171 are supported in spaced relation to each other by suitable streamlined struts 173. Suitable streamlined casings 174 are located in passage 170 around pipes 155 for directing gas flow around the pipes. The discharge ends of pipes 155 are supported in a pair of spaced disks 175 which at their outer edges are attached to wall 171. The one disk 175 serves also to support baffles 159 which are suitably attached to it.

The powerplant as a whole, as shown in Fig. 14, may be provided with an outer casing or covering 176 (Figs. 1 and 2) suitably attached to wall 49 and to wall 8. At its forward end, it is shaped to cooperate with cap 51 in defining air admission passage 3.

The power plant is started by supplying electric current to motor 47 and is operated by the motor until combustion is started in the combustion chambers (the compressor supplying air to the combustion chambers and the fuel pump or pumps supplying fuel oil thereto) and the gases generated are sufficient to effect operation of the turbine wheel at a speed such that the turbine can take over the driving of the compressor. After combustion is started, the ignition plugs may be disconnected from their circuits and after the turbine is operating, motor 47 may be operated by it as a generator. Air from the compressor is supplied to the annular air chambers 108 of the several combustion chambers from which chambers it flows through openings 134 to the interior of inner liners 106 where combustion occurs. A part of the air from chamber 108 flows entirely through such space and out through the passage between the discharge ends of walls 105 and 106. Here it is divided, a part flowing to the space within transition conduit 132 and a part flowing to the space surrounding transition conduits 132 from which space it flows to nozzles 90 through the openings 135. This serves to cool the parts over which the air flows and to protect walls 88 and 6 from the high temperature gases flowing through conduits 132.

By my invention, I provide a unitary power plant which is compact and which by reason of the combustion chamber arrangement is of minimum diameter. The arrangement wherein the turbine wheel is overhung on an aft bearing spaced from the mid-bearing and tied to it by ribs between which the combustion units are located and on which they are in part supported, I consider one important feature of my invention as such arrangement serves to provide a rigid unitary structure in which the bearings will be maintained in accurate alignment even though the unit as a whole may move on its supports.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a gas turbine powerplant the combination of a compressor having a casing, a compressor rotor having projecting shaft end portions, bearing means in said casing for rotatably supporting said shaft portions, one of said shaft end portions having a pair of concentric axially extending sleeves, the inner sleeve having a threaded bore and the outer sleeve being provided with spline means, an aft frame structure connected to the compressor and supporting an annular member spaced axially from the compressor, an aft bearing carried by said annular member, combustor means surrounding the aft frame structure, a casing member forming part of the aft frame structure supporting said combustor means, a turbine casing connected with said casing member, a turbine rotor within said aft frame structure and turbine casing including a hollow shaft carried in the aft bearing and having a forward end portion drivingly engaging said spline means and a rearward end portion carrying a bucket-wheel in overhung relation to the aft bearing, and means for locating and securing the rotor including a turbine shaft bolt projecting entirely through said hollow shaft with a rearward end portion engaging the bucket-wheel hub and a forward end portion threadedly engaging the bore of said compressor shaft end portion, whereby the turbine rotor may be readily removed by unscrewing the shaft bolt from the exterior side of the bucket-wheel without disturbing other components of the powerplant.

2. In a gas turbine powerplant the combination of a compressor having a casing, a compressor rotor with a projecting shaft end portion, bearing means in said casing for supporting the rotor, said projecting shaft end portion having a pair of concentric axially extending sleeves, the inner sleeve having a threaded bore, an aft frame structure connected to the compressor casing and supporting an annular member spaced from the compressor, an aft bearing carried by said annular member, combustor means surrounding the aft frame structure, a ring-like casing member forming part of the aft frame structure supporting said combustor means, a turbine casing connected to said ring-like casing member, a turbine rotor within said aft frame structure and turbine casing including a hollow shaft carried in the aft bearing and having a forward end portion adapted to be connected to said compressor shaft portion, said hollow shaft having also a rearward end portion carrying a bucket-wheel in overhung relation to the aft bearing, connecting means for said compressor shaft end portion and said forward end portion of the hollow shaft for transmitting torque therebetween while permitting axial displacement of the turbine shaft relative to the compressor shaft, and means for securing the hollow rotor in desired axial relation to the compressor rotor including a turbine shaft bolt projecting entirely through said hollow shaft with a rearward end portion engaging the bucket-wheel hub and a forward end portion threadedly engaging the bore of said compressor shaft end portion.

3. In a gas turbine powerplant the combination of a compressor having a casing, a compressor rotor with a projecting shaft end portion, bearing means in said casing for supporting the rotor, members connected to said shaft end portion defining a pair of concentric axially extending sleeves, the inner sleeve having a threaded bore and the outer sleeve being provided with spline means, an aft frame structure connected to the compressor casing and supporting an annular member spaced axially from the compressor, an aft bearing carried by said annular member, combustor means surrounding the aft frame structure, a ring-like casing member forming part of the aft frame structure and supporting said combustor means, a turbine casing connected to said ring-like casing member, a turbine rotor within said aft frame structure and turbine casing including a hollow shaft supported in the aft bearing and having a forward splined end portion drivingly engaging the compressor shaft spline and a bucket-wheel mounted on the hollow shaft, and means for locating and securing the turbine rotor including a turbine shaft bolt projecting entirely through said hollow shaft and having a rearward end portion engaging the adjacent end portion of the shaft and a forward end portion engaging said threaded bore, whereby the turbine rotor may be readily removed by unscrewing the shaft bolt from the exterior side of the bucket-wheel without disturbing other components of the powerplant.

4. In a gas turbine powerplant the combination of a compressor having a casing and a rotor supported therein with a rotor shaft end portion projecting therefrom and having a central threaded bore, an aft frame structure secured to the end of the casing and carrying an annular bearing support member coaxial with the compressor shaft and axially spaced from the end thereof, a plurality of combustion chambers disposed in a ring around the aft frame structure, a ring-like casing member forming part of the aft frame structure and supporting said combustion chambers, a turbine casing connected to said ring-like casing member, an aft bearing carried in said support member, and a turbine rotor within said aft frame structure and turbine casing including a bucket-wheel on a hollow shaft supported in the aft bearing, said hollow shaft having an end portion axially spaced from said bucket-wheel and including coupling means drivingly engaging said compressor rotor while permitting relatively axially displacements of said compressor and turbine rotors, and a turbine shaft bolt projecting entirely through said hollow shaft and said bucket-wheel with a forward end portion threadedly engaging said central bore in the compressor rotor shaft, the opposite end of said bolt having means for locating and securing the turbine rotor axially relative to said compressor rotor, whereby the turbine rotor may be readily removed by unscrewing the shaft bolt without disturbing other components of the powerplant.

5. In a gas turbine powerplant the combination of a compressor having a casing and a rotor supported therein with a rotor shaft end portion projecting therefrom and having a central threaded bore, an aft frame structure secured to the compressor and carrying an annular bearing support member coaxial with the compressor shaft and axially spaced from the end thereof, an aft bearing carried in said support member, combustor means surrounding the aft frame structure, a casing member forming part of the aft frame structure supporting said combustor means, a turbine casing connected with said casing member, and a turbine rotor within said aft frame structure and turbine casing including a bucket-wheel on a hollow shaft supported in the aft bearing and having a forward splined end portion drivingly engaging said compressor rotor shaft end portion, nozzle means extending between the combustor means and bucket-wheel and spaced from the casing member, and means for securing and locating the turbine rotor axially including a turbine shaft bolt projecting entirely through the turbine shaft with a forward end portion threadedly engaging said central bore, said bolt also having a threaded rearward end portion and having a nut engaging said threaded portion and the adjacent end portion of the turbine rotor, whereby the turbine rotor may be readily removed by unscrewing the turbine shaft nut without disturbing other components of the powerplant.

6. A gas turbine powerplant comprising a compressor with a casing, a compressor rotor rotatably supported within said casing and having a threaded central bore portion projecting through said casing, a chamber connected to said compressor for receiving fluid discharged therefrom and including means for heating said fluid within said chamber, a turbine including a turbine rotor carried by a hollow shaft having an end portion adapted to drivingly engage said compressor rotor and connected to said chamber for receiving heated fluid therefrom, an aft frame structure secured to the compressor and supporting said chamber, nozzle means supported by said aft frame structure and extending between said chamber and turbine and means for securing said turbine rotor to said compressor rotor in driving relation including a turbine shaft bolt projecting entirely through said hollow shaft within said aft frame structure and having a forward end portion threadedly engaging said bore portion of said compressor rotor.

7. A gas turbine powerplant comprising a compressor with a casing and a rotor having a threaded central bore portion projecting through said casing, bearing means within said casing for rotatably supporting said rotor, means for heating fluid discharged from said compressor including a chamber connected thereto, a turbine connected by nozzle means to said chamber for receiving heated fluid discharged therefrom and including a turbine rotor for driving said compressor, an aft frame structure secured to the compressor and supporting said chamber and said nozzle means said turbine rotor including a bucket-wheel carried by a hollow shaft within said aft frame structure, second bearing means between said compressor rotor and said bucket-wheel for rotatably supporting said turbine rotor coaxially with said compressor rotor and with said bucket-wheel in overhung relation to said second bearing means, means connecting an end portion of said hollow shaft and said compressor rotor in torque transmitting relation while permitting axial displacement of said hollow shaft relative to the compressor rotor, and means for securing the turbine rotor in desired axial relation to the compressor rotor including a turbine shaft bolt projecting entirely through said hollow shaft and having an end portion engaging the hub of said bucket-wheel and another end portion threadedly engaging said central bore.

8. An elastic fluid turbine powerplant comprising an axial flow compressor with a casing and a compressor rotor rotatably supported therein, means for heating fluid discharged from said compressor including a chamber connected in series flow relation to said compressor, a turbine including a rotor connected by nozzle means to said chamber for receiving heated fluid discharged therefrom, said turbine rotor including a bucket-wheel carried by a hollow shaft having a splined end portion for drivingly engaging said compressor rotor, an aft frame structure surrounding said hollow shaft and providing support for said nozzle means and said chamber and connected to the compressor casing and carrying an aft bearing in axially spaced relation with said casing and in coaxial relation with the compressor rotor, said turbine rotor being supported in the aft bearing with the bucket wheel in overhung relation therewith, said compressor rotor having a shaft end portion with a central threaded bore projecting through the compressor casing and defining surfaces for engaging said splined end portion of the turbine rotor, and means for securing the turbine rotor in drivingly engaged relation with and in the desired axial location relative to the compressor rotor including a turbine shaft bolt projecting entirely through the turbine shaft with an end portion threadedly engaging said central bore and another end portion engaging the turbine rotor, whereby the turbine rotor may be readily removed by unscrewing the shaft bolt without disturbing other components of the powerplant.

9. An elastic fluid turbine powerplant in accordance with claim 8 wherein the hollow shaft is relatively long as compared to the thickness of said bucket-wheel, and further including a damper bearing assembly between said aft bearing and the splined end portion of said hollow shaft, said assembly including a bearing housing with surfaces frictionally engaging mating surfaces of said aft frame structure for dampening vibration of said hollow shaft, and further including a splined sleeve member secured to said projecting shaft end portion of the compressor rotor for engaging the splined end portion of the turbine rotor.

10. An elastic fluid turbine powerplant comprising a compressor, a combustor for heating fluid discharged from the compressor and connected thereto, a turbine including a casing and a rotor for driving said compressor connected to said combustor and nozzle means for receiving heated fluid discharged from said combustor, said nozzle means comprising radially spaced concentric inner and outer annular walls connected to a plurality of radially extending nozzle blades, an aft frame structure connected to the compressor and carrying bearing means for rotatably supporting said turbine rotor, a radially extending supporting wall secured to said aft frame structure adjacent to said bearing means, and a flexible nozzle support member having an inner circumferential portion secured to the radially extending support wall and an outer circumferential portion secured to said inner annular wall of the nozzle means and having a convoluted intermediate portion between said circumferential portions.

11. A gas-turbine engine comprising a compressor having a rotor and a stator casing enclosing the rotor, a turbine having a rotor coaxial with and axially-spaced from the compressor rotor and a stator casing enclosing the rotor, a driving shaft connecting the compressor rotor to the turbine rotor, a plurality of combustion chambers disposed in a ring around the said shaft to extend from the compressor toward the turbine, an exhaust unit supported from the turbine casing on the side thereof remote from the compressor, an intermediate casing surrounding the shaft within the ring of combustion chambers and secured to the compressor casing to extend toward the turbine, a ring-like casing member having formed therein a plurality of circumferentially-spaced apertures one for each combustion chamber to receive and support its outlet end, said ring-like casing member being connected to the intermediate casing and to the outer periphery of the turbine casing to transmit structural loads therebetween, and a plurality of nozzle-boxes one for each combustion chamber extending from the outlets of the combustion chambers to deliver the working fluid from the combustion chambers to the turbine, the walls of the nozzle-boxes being spaced from the ring-like casing member so that the latter is out of direct contact with the flow of working fluid through said nozzle boxes.

12. A gas-turbine engine as claimed in claim 11, wherein said turbine casing comprises a stationary shroud for the turbine rotor, an outer ring secured directly to said shroud, an inner ring located within and radially spaced from the outer ring, and a series of guide-blades supported between the inner and outer rings, and wherein the outer edge of said apertured ring-like casing member is connected to the outer ring by a first tubular member surrounding said nozzle boxes and the inner edge of said apertured ring-like casing member is connected to the inner ring by a second tubular member disposed radially inside the nozzle-boxes said apertured ring-like casing member and said first and second tubular members together forming a chamber enclosing the nozzle-boxes.

13. A gas turbine powerplant comprising a compressor having a rotor with projecting shaft end portions and a stator casing enclosing the rotor, bearing means in said casing rotatably supporting said shaft portions, one of said shaft end portions having a pair of concentric axially extending sleeves, the inner sleeve having a threaded bore and the outer sleeve being provided with spline means, an aft frame structure connected to the compressor and supporting an annular member spaced axially from the compressor, an aft bearing carried by said annular member, combustor means disposed in a ring around the aft frame structure, a ring-like casing member forming part of the aft frame structure supporting said combustor means, a turbine casing connected with said ring-like casing member, a turbine rotor including a hollow shaft within said aft frame structure and carried in the aft bearing and having a forward end portion drivingly engaging said spline means and a rearward end portion carrying a bucket-wheel in overhung relation to the aft bearing, said combustor means extending from said compressor toward said turbine, bolt means engaging the bucket-wheel hub and extending through said hollow shaft connecting said inner sleeve of said compressor shaft end portion for locating and securing the turbine rotor, an exhaust unit supported from the turbine casing, an intermediate casing surrounding the driving shaft within the ring of combustor means and said aft frame structure and secured to the compressor casing and said ring-like casing member and said annular member, a shroud member surrounding said sleeves and connecting said compressor casing and said intermediate casing, said ring-like casing member having formed therein a plurality of circumferentially spaced apertures to receive and support the combustor means, said ring-like casing member being connected to the outer periphery of the turbine casing to transmit structural loads between said turbine casing and said intermediate casing, and a plurality of nozzle means for said combustor means supported from said turbine casing and said ring-like casing member and extending from the outlet of the combustor means to deliver the working fluid from the combustor means to the turbine.

References Cited in the file of this patent

UNITED STATES PATENTS

| | | |
|---|---|---|
| 1,511,517 | Henderson | Oct. 14, 1924 |
| 2,073,191 | Belluzzo | Mar. 9, 1937 |
| 2,091,998 | Lysholm | Sept. 7, 1937 |
| 2,305,226 | Stalker | Dec. 15, 1942 |
| 2,405,723 | Way | Aug. 13, 1946 |
| 2,410,450 | Kroon | Nov. 5, 1946 |
| 2,469,439 | Lundquist | May 10, 1949 |
| 2,494,821 | Lombard | Jan. 17, 1950 |
| 2,625,013 | Howard et al. | Jan. 13, 1953 |
| 2,661,594 | Petrie | Dec. 8, 1953 |

FOREIGN PATENTS

| | | |
|---|---|---|
| 384,532 | Germany | Nov. 2, 1923 |